(12) United States Patent
He et al.

(10) Patent No.: US 12,431,979 B2
(45) Date of Patent: Sep. 30, 2025

(54) WAVELENGTH DIVISION MULTIPLEXING DEVICE HAVING WAVELENGTH DIVISION MULTIPLEXING FILTER

(71) Applicant: Focuslight Technologies, Inc., Xi'an (CN)

(72) Inventors: Chun He, Fremont, CA (US); Lei Gao, Xi'an (CN); Xingsheng Liu, Xi'an (CN)

(73) Assignee: FOCUSLIGHT TECHNOLOGIES, INC., Xi'an (CN)

( * ) Notice: Subject to any disclaimer, the term of this patent is extended or adjusted under 35 U.S.C. 154(b) by 303 days.

(21) Appl. No.: 18/123,298

(22) Filed: Mar. 19, 2023

(65) Prior Publication Data

US 2023/0327768 A1 Oct. 12, 2023

(30) Foreign Application Priority Data

Apr. 8, 2022 (CN) .......................... 202210369498.3

(51) Int. Cl.
| | |
|---|---|
| *H04B 10/29* | (2013.01) |
| *G02B 6/293* | (2006.01) |
| *H04B 10/294* | (2013.01) |
| *H04J 14/02* | (2006.01) |

(52) U.S. Cl.
CPC ..... *H04B 10/2941* (2013.01); *G02B 6/29361* (2013.01); *G02B 6/2938* (2013.01); *H04J 14/02* (2013.01)

(58) Field of Classification Search
CPC .............. G02B 6/29361; G02B 6/2938; H04B 10/2941
USPC .......................................... 385/24
See application file for complete search history.

(56) References Cited

U.S. PATENT DOCUMENTS

| | | | |
|---|---|---|---|
| 6,603,897 B1 * | 8/2003 | Scholz ................ | G02B 6/2938 359/260 |
| 7,212,343 B1 | 5/2007 | He et al. | |
| 11,131,804 B1 | 9/2021 | He et al. | |

* cited by examiner

*Primary Examiner* — Jerry M Blevins
(74) *Attorney, Agent, or Firm* — HOWARD M COHN and Associates, LLC (57) ABSTRACT

An optical multiplexing system comprises a wavelength division multiplexing (WDM) device, an incoming light input to the WDM device, and an exiting light output from the WDM device. The WDM device comprises a WDM filter, an incident light is incident at the WDM filter having an incident angle at the WDM filter. The incident light is partially transmitted through the WDM filter and partially reflected from the WDM filter. An angle formed by the incoming light and the exiting light is larger than twice of the incident angle at the WDM filter.

15 Claims, 10 Drawing Sheets

WAVELENGTH DIVISION MULTIPLEXING DEVICE HAVING WAVELENGTH DIVISION MULTIPLEXING FILTER

FIELD OF THE INVENTION

This invention relates to an optical multiplexing system (OMS), and in particular relates to an OMS using a wavelength division multiplexing (WDM) device having WDM filter.

BACKGROUND OF THE INVENTION

The communication networks demand ever increasing bandwidths and flexibility to different communication protocols. WDM (wavelength division multiplexing) is one of the key technologies for such optical communication networks. WDM employs multiple wavelengths in a single fiber to transmit in parallel different communication protocols and bit rates. Transmitting several channels in a single fiber at different wavelengths can multi-fold expand the transmission capacity of the existing optical transmission systems.

A system that multiplexes different wavelength channels into one fiber is a multiplexer, and a system that divides the multiplexed channels into individual channels is a demultiplexer. Specifically, a multiplexer combines several channels of optical signals into a single signal. In reverse, a demultiplexer separates a single multichannel signal into several individual channel signals. A system that may perform both demultiplexing and multiplexing is referred to a demultiplexer/multiplexer or DeMux/Mux. A DeMux/Mux is an optical multiplexing system (OMS).

An OMS may employ a plurality of WDM filters arranged in two rows. A WDM filter is usually an interference filter, to separate a light beam of multiple wavelengths into multiple beams of light having individual wavelengths, and to combine multiple beams of light having different wavelengths into a single light beam of multiple wavelengths. The incident angle of incident light at the WDM filter must be small. Thus, the distance between two rows of WDM filters must be large, for a predetermined distance of two WDM filters in the same row, to keep the incident angle small. On the other hand, the distance between two rows of WDM filters must be small to minimize the lateral shift of light after multiple reflections from WDM filters.

Accordingly, an OMS having small distance between two rows of WDM filters while also having small incident angle at WDM filter is in demand.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
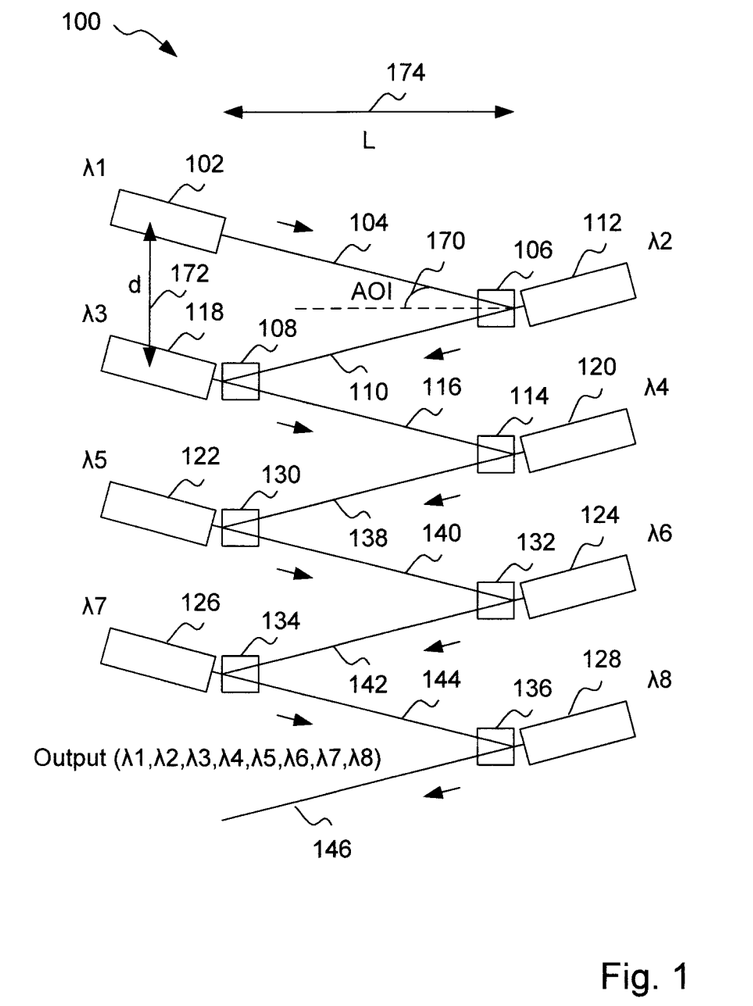
FIG. 1 illustrates schematically an exemplary OMS.

FIG. 1 illustrates schematically an exemplary OMS 100. OMS 100 comprises a first light provider (LP) 102 providing light 104 having wavelength λ1. Light 104 is reflected by a first WDM filter 106 toward a second WDM filter 108 forming a first reflected light 110. Light 104 is incident at first WDM having an incident angle denoted as angle of incidence (AOI) 170. A second LP 112 provides light having wavelength λ2 transmitting through first WDM filter 106, such that light 110 has multiple wavelengths μ1 and λ2.

Light 110 is reflected by second WDM filter 108 toward a third WDM filter 114 forming a second reflected light 116. A third LP 118 provides light having wavelength λ3 transmitting through second WDM filter 108, such that light 116 has multiple wavelengths λ2, and λ3. The process is repeated until light 144 is reflected by a seventh WDM filter 136 and output from OMS 100 as an output light 146. A eighth LP 128 provides light having wavelength λ8 transmitting through seventh WDM filter 136, such that output light 146 has multiple wavelengths λ1, λ2, λ3, λ4, λ5, λ6, λ7, and λ8. OMS 100 may have more than 8 channels. It may have 16 channels, or any number channels.

It is appreciated that a WDM filter is bandpass filter. Light having wavelengths in the band passes or transmits through the filter, while light having wavelengths outside the band is reflected by the filter. Alternatively, a WDM filter is band-reject filter. Light having wavelengths in the band is reflected by the filter, while light having wavelengths outside the band passes or transmits through the filter.

A LP may be a light source including, laser diode, light emitting diode (LED), or any light source. A LP may also be a collimator with a fiber to transfer light from a light source including laser diode, LED or any light source.

Figure 2:
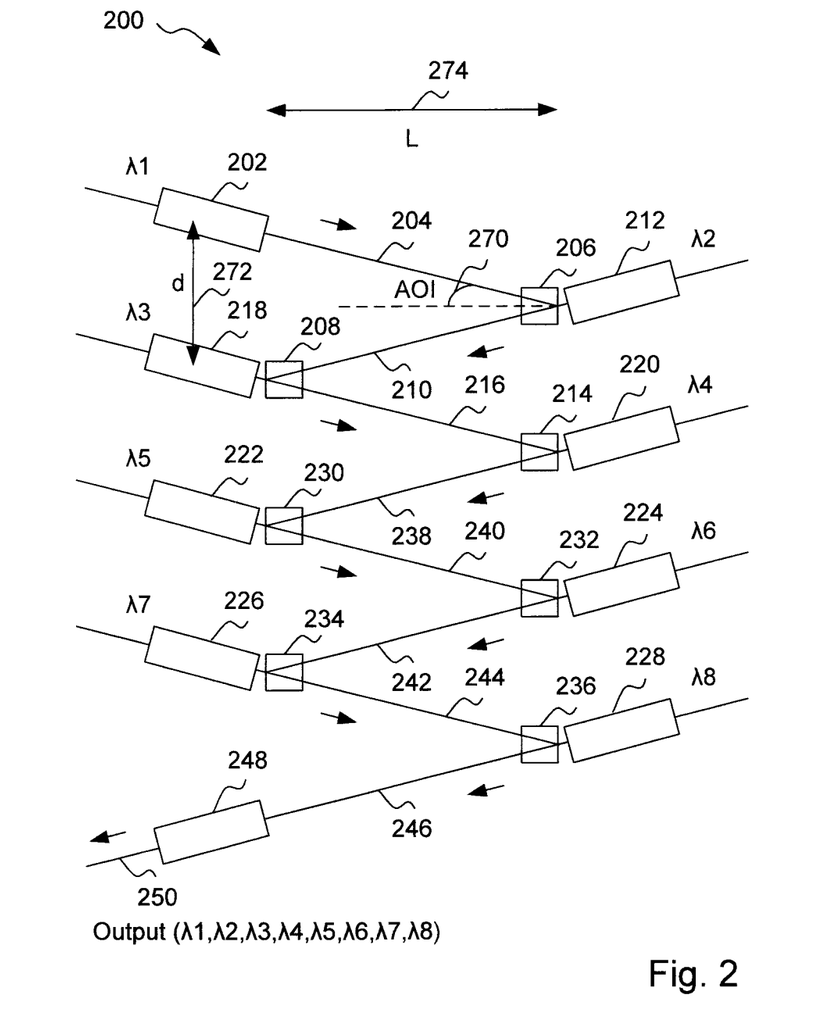
FIG. 2 illustrates schematically an exemplary integrated wavelength division multiplexer (IWDM).

FIG. 2 illustrates schematically an exemplary integrated wavelength division multiplexer (IWDM) 200. An IWDM is a DeMux/Mux. IWDM 200 is similar to OMS 100 of FIG. 1. LPs in FIG. 1 are replaced by collimators having fibers attached. A first collimator 202 provides light 204 having wavelength λ1 Light 204 is reflected by a first WDM filter 206 toward a second WDM filter 208 forming a first reflected light 210. A second collimator 212 provides light having wavelength λ2 transmitting through first WDM filter 206, such that light 210 has multiple wavelengths λ1 and λ2.

Light 210 is reflected by second WDM filter 208 toward a third WDM filter 214 forming a second reflected light 216. A third collimator 218 provides light having wavelength λ3 transmitting through second WDM filter 208, such that light 216 has multiple wavelengths λ1, λ2, and λ3. The process is repeated until light 244 is reflected by a seventh WDM filter 236 forming a seventh reflected light 246 and enter a ninth collimator 248. A eighth collimator 228 provides light having wavelength λ8 transmitting through seventh WDM filter 236, such that light 246 has multiple wavelengths λ1, λ2, λ3, λ4, λ5, λ6, λ7, and λ8. Collimator 248 outputs an output light 250 similar to light 246 having multiple wavelengths λ1, λ2, λ3, λ4, λ5, λ6, λ7, and λ8. IWDM 200 may have more than 8 channels. It may have 16 channels, or any number channels.

Figure 3:
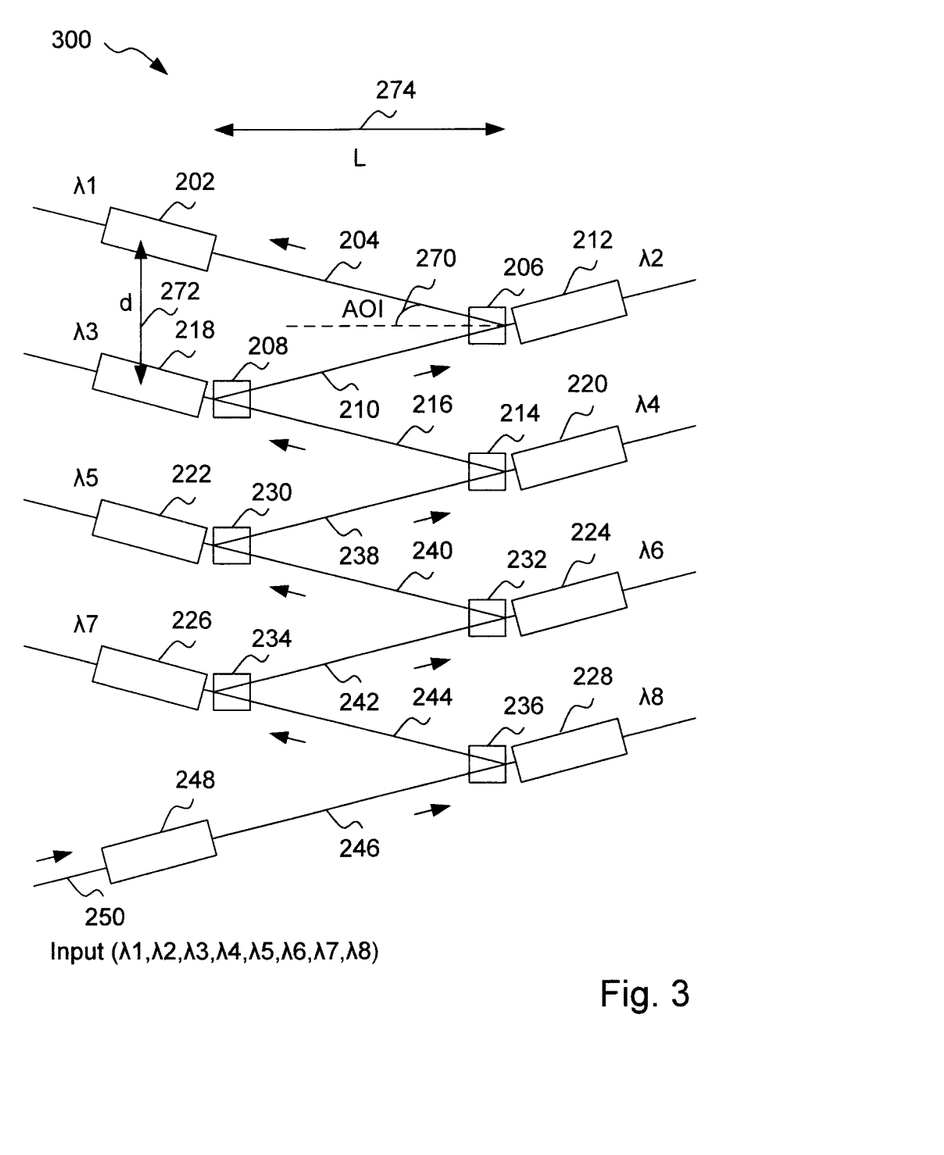
FIG. 3 illustrate schematically an exemplary IWDM functioning as a demultiplexer.

FIG. 3 illustrate schematically an exemplary IWDM 300 functioning as a demultiplexer, which is a reversed IWDM 200 of FIG. 2. Collimator 248 is input with an input light 250 having multiple wavelengths λ1, λ2, λ3, λ4, λ5, λ6, λ7, and λ8. Light 246 having multiple wavelength 1, λ2, λ3, λ7, and λ8 from collimator 248 is reflected by WDM filter 236 toward WDM filter 234 forming reflected light 244. Light 244 reflected by WDM filter 236 toward WDM filter 234 has multiple wavelengths λ1, λ2, λ3, λ4, λ5, λ6, λ7, where light having wavelength λ8 is transmitted through WDM filter 236 entering collimator 228. Light 244 is further reflected by WDM filter 234 toward WDM filter 232 forming reflected light 242. Light 242 reflected by WDM filter 234 toward WDM filter 232 has multiple wavelengths λ1, λ2, λ3, λ4, λ5, λ6, where light having wavelength λ7 is transmitted through WDM filter 234 entering collimator 226. The process is repeated until light 210 is reflected by WDM filter 206 forming reflected light 204 and entering collimator 202. Light 204 has remaining wavelength λ1 IWDM 300 may have more than 8 channels. It may have 16 channels, or any number channels.

Referring back to FIG. 2, light 204 from collimator 202 incident at WDM filter 206 at AOI 270. AOI 270 must be kept small to preserve low insertion loss, predetermined central wavelength and passband, and low polarization dependent loss. For coarse WDM (CWDM), the highest AOI is 12-15 degree. Beyond this value, its polarization dependent loss, passband, and insertion loss are starting to degrade substantially and the wavelength is starting to shift.

For example, all collimators are standard collimators having outer diameter between 1.3-3.2 mm. Accordingly, a spacing d 272 between neighboring collimators in a row may be larger than 3.5 mm (larger than the outer diameter of collimator). For AOI 270 13.5 degree, d 272 3.5 mm, one may find that a distance between two collimator rows L 274 is 7.3 mm. The angle formed between light 210, which is reflected from WDM filter 206, and light 204, which is incident at WDM filter 206, is 2×(AOI), which is 27 degree in this example.

Smaller L 274 is demanded in order to make OMS 100, IWDM 200, or IWDM 300 compact. However, in the example shown, d 272 is 3.5 mm, if L 274 is smaller than 7.3 mm, AOI 270 will be larger than 13.5 degree, which will cause polarization dependent loss, insertion loss, and central wavelength and passband shift. The invention disclosed herewith will allow smaller L (e.g., L 274 is smaller than 7.3 mm), but does not increase the value of AOI (e.g., AOI 270 is still 13.5 degree).

Figure 4:
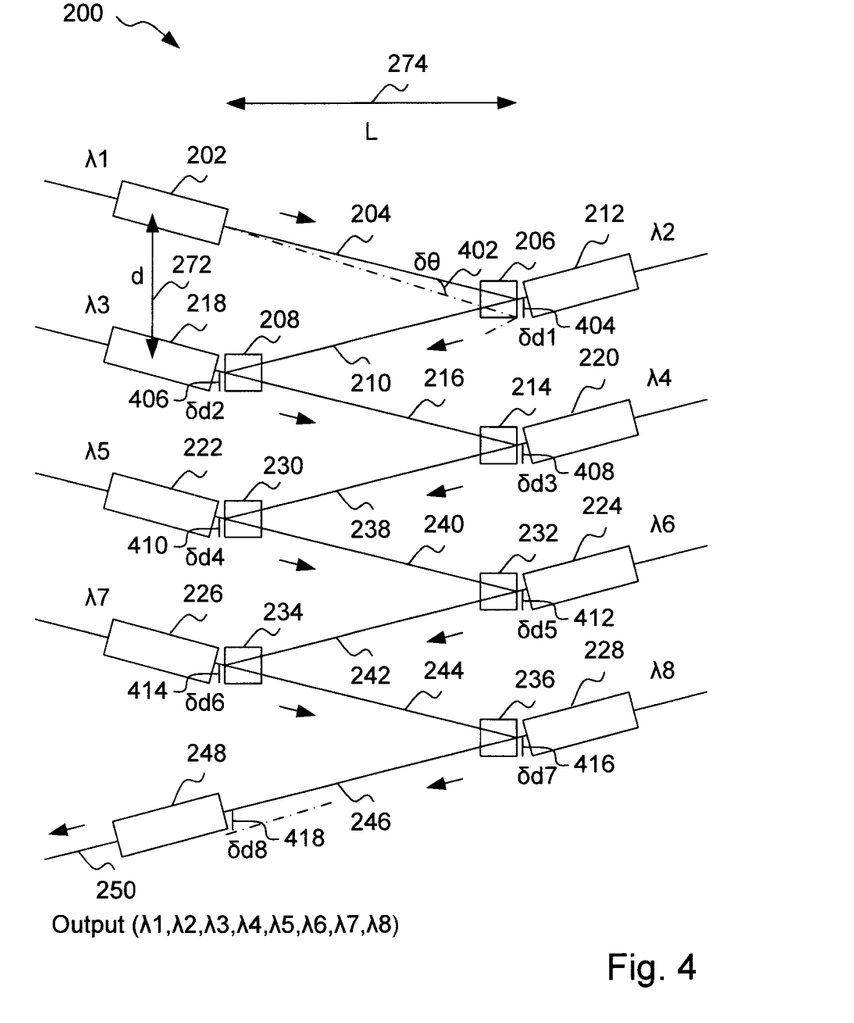
FIG. 4 illustrates schematically the effect of a small tilt angle of light from a collimator.

FIG. 4 illustrates schematically the effect of a small tilt angle δθ 402 of light 204 from collimator 202 in IWDM 200 of FIG. 2. Tilt angle δθ 402 causes lateral shifts of light, δd1, δd2, δd3, δd4, δd5, δd6, and δd7, at WDM filters 206, 208, 214, 230, 232, 234, and 236, respectively, and δd8 at collimator 248. Note that collimator 248 has no WDM filter. For tilt angle δθ 402 being 0.05 degree that may be generated during the adhesive curing process, the device burn-in test, or the device stress test, δd4 would be 0.026 mm and δd8 would be 0.052 mm, for L 274 being 7.3 mm. If IWDW 200 has 16 channels, the $16^{th}$ lateral shift would be 0.105 mm. The lateral shift of light is proportional to the light path. The lateral shift of light is proportional to L 274.

For a typical beam diameter of 0.3 mm, the offset of 0.026 mm lateral shift δd4 creates an extra loss of 0.13 dB, which is acceptable in manufacturing. The offset of 0.052 mm lateral shift δd8 creates an extra loss of 0.53 dB, which is just on the margin of failure based on Telcordia test standards of maximum 0.5 dB IL variation. While the offset of 0.105 mm lateral shift creates an extra 2.11 dB loss, which is totally not acceptable by any standards or by customer acceptance criteria.

Lateral shifts δd1, δd2, δd3, δd4, δd5, δd6, δd7 and δd8, can be reduced if L 274 is reduced. However, reducing L 274 will increase AOI 170, which is not allowed. Increasing AOI 170 will cause polarization dependent loss, insertion loss, and central wavelength and passband shift. The invention disclosed herewith will allow the reduction of L 274, which will reduce the lateral shift of light entering the last collimator, and reduce the size of the system, but does not increase the value of AOI 170.

Figure 5:
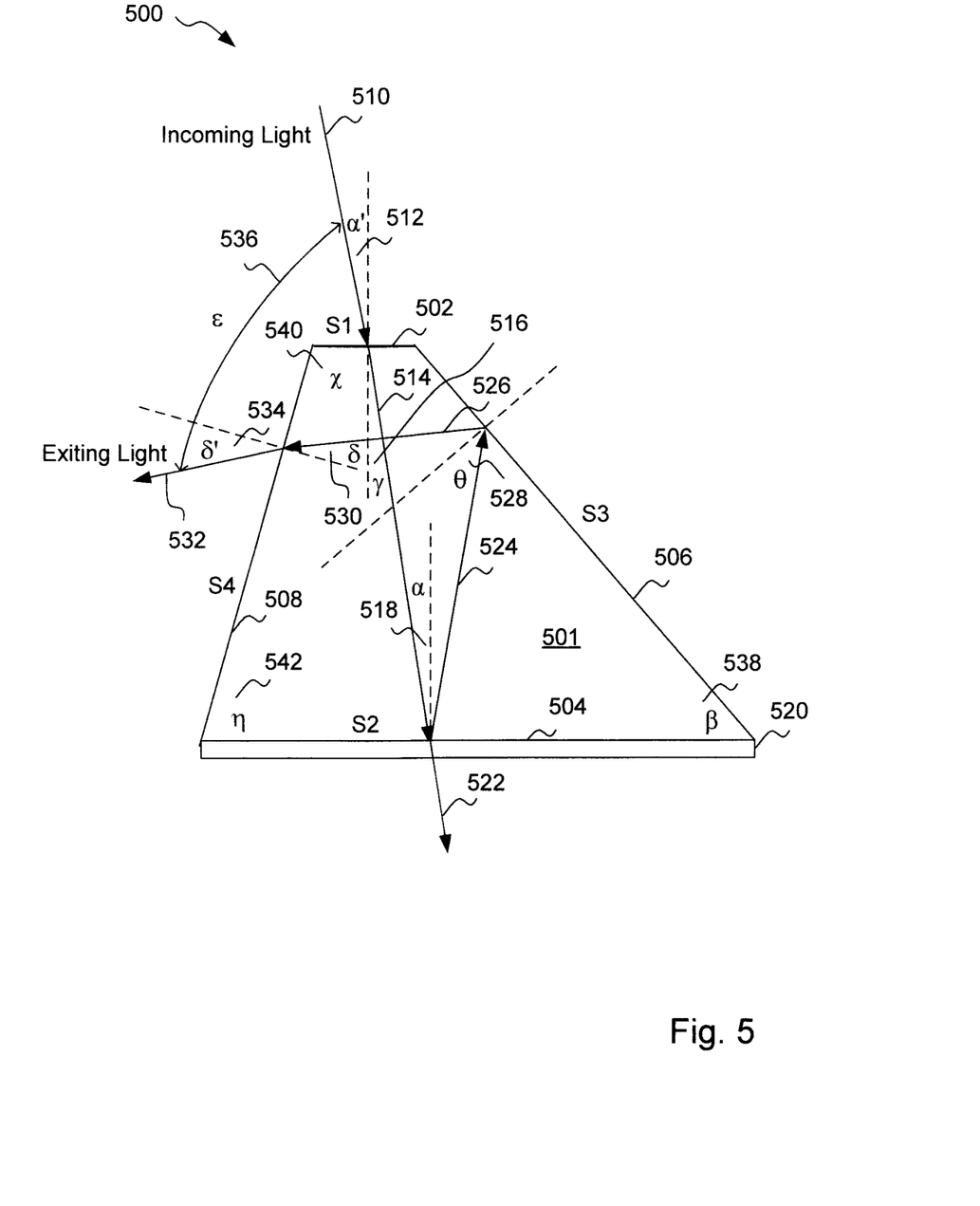
FIG. 5 illustrates schematically an exemplary prism-WDM filter, according to an embodiment of the invention.

FIG. 5 illustrates schematically an exemplary prism-WDM filter 500, according to an embodiment of the invention. Prism-WDM filter 500 comprises a prism 501 having four sides, a first side S1 502, a second side S2 504, a third side S3 506, and a fourth side S4 508. First side S1 502 and second side S2 504 are opposite sides, third side S3 506 and fourth side S4 508 are opposite sides. First side S1 502 may or may not be parallel to second side S2 504. An incoming light 510 is incident at first side S1 502 forming an incoming angle α' 512 at first side S1 502. Incoming light 510 is refracted in prism 501 having a refractive index n, becoming an incident light 514 having a refraction angle γ 516 less than α' 512. Incident light 514 is incident at side S2 504 having incident angle α 518. If first side S1 502 is parallel to second side S2 504, α 518 is the same as γ 516.

A WDM filter 520 is immediately attached to an external surface of second side S2 504, which is shown as a bottom of the prism of prism-WDM filter 500. A WDM filter is typically a film stack. The film stack of WDM filter 520 may be directly coated on the external surface of second side S2 504, or coated on a filter substrate and immediately attached to the external surface of second side S2 504. In this manner, incident light 514 passes second side S2 504 incident at WDM filter 520 having an incident angle, which is same as incident angle α 518. Part of incident light 514 is transmitted through WDM filter 520 as a transmitted light 522, and part of incident light 514 is reflected in prism 501 toward third side S3 506 as a reflected light 524 having a reflection angle same as incident angle α 518. Incident angle α 518 is similar to AOI 170 in OMS 100 of FIG. 1, or AOI 270 in IWDM 200 of FIG. 2 or IWDM 300 of FIG. 3. Incident light 514 is incident at WDM filter 520 at incident angle α 518

Reflected light 524 is incident at third side S3 506 and is reflected by total internal reflection as a total-reflection light 526 from third side S3 506 toward fourth side S4 508 having a total-reflection angle θ 528. Total-reflection light 526 is incident at fourth side S4 508 having an incident angle δ 530, and is refracted out from prism-WDM filter 500 as an exiting light 532 With a refraction angle δ' 534. Exiting light 532 exits prism 501 of prism-WDM filter 500. The angle formed between incoming light 510 and exiting light 532 is ε 536. Angle ε 536 is larger than twice of incident angle α 518 at WDM filter 520. Angle ε 536 is larger than the angle formed between light 104 from LP 102 and reflected light 110 from WDM filter 106 in OMS 100 of FIG. 1, which is 2α or twice AOI 170.

Second side S2 504 and third side S3 506 form an internal angle β 538. Second side S2 504 and fourth side S4 508 form an internal angle η 542. First side S1 502 and fourth side S4 508 form an internal angle χ 540.

By using prism-WDM filter 500 replacing WDM filter 106 in OMS 100 of FIG. 1, the angle formed between light 104 from LP 102 and reflected light 110 from WDM filter 106 is ε 536, which is the angle formed between incoming light 510 and exiting light 532. If L 174 decreases, £ 536 increases, but AOI 270, which is equivalent to incident angle α 518, may not be larger than the required AOI, e.g., 13.5 degree.

Incoming angle α' 512 at first side S1 502 is determined by $$\sin \alpha' = n \sin \alpha, \quad (1)$$

for first side S1 502 parallel to second side S2 504, where n is the refractive index of prism 501 of prism-WDM filter 500, for example n is 1.44. First side S1 502 may be coated with broadband anti-reflection (BBAR) coating. Second side S2 504 and third side S3 506 form internal angle β 538. In order to get total internal reflection at third side S3 506, angle β 538 is determined by $$\beta \geq a \sin(1/n) + \alpha, \quad (2)$$

where α 518 is the incident angle at second side S2 504, which may be same as AOI 170 in OMS 100 of FIG. 1. Third side S3 506 may not be coated with BBAR coating.

First side S1 502 and fourth side S4 508 form internal angle χ 540. Second side S2 504 and fourth side S4 508 form internal angle η 542. Fourth side S4 508 may be coated with BBAR coating. If first side S1 502 is parallel to second side S2 504, angle χ 540 and angle η 542 are as follows $$\chi + \eta = 180. \quad (3)$$

From the geometry of prism 501 and refractive index of prism n being 1.44, for angle η 542 being 60 degree, angle ε is given in Table 1 for various angle β and angle α.

TABLE 1

| | ε (degree), η = 60 degree | | | | |
|---|---|---|---|---|---|
| β (degree) | α = 12 degree | α = 12.5 degree | α = 13 degree | α = 13.5 degree | α = 14 degree |
| 57 | 69.03 | 69.06 | 69.09 | 69.12 | 69.15 |
| 58 | 65.98 | 66.00 | 66.02 | 66.04 | 66.05 |
| 59 | 62.98 | 62.98 | 62.99 | 63.00 | 63.01 |
| 60 | 60.00 | 60.00 | 60.00 | 60.00 | 60.00 |
| 61 | 57.05 | 57.04 | 57.04 | 57.03 | 57.02 |
| 62 | 54.12 | 54.11 | 54.10 | 54.09 | 54.08 |
| 63 | 51.21 | 51.20 | 51.18 | 51.16 | 51.15 |
| 64 | 48.31 | 48.29 | 48.27 | 48.26 | 48.23 |
| 65 | 45.42 | 45.40 | 45.38 | 45.36 | 45.33 |
| 66 | 42.53 | 42.51 | 42.49 | 42.47 | 42.44 |
| 67 | 39.64 | 39.62 | 39.60 | 39.58 | 39.55 |
| 68 | 36.75 | 36.73 | 36.71 | 36.69 | 36.66 |
| 69 | 33.85 | 33.83 | 33.81 | 33.79 | 33.77 |
| 70 | 30.94 | 30.92 | 30.91 | 30.89 | 30.87 |
| 71 | 28.01 | 28.00 | 27.99 | 27.98 | 27.96 |
| 72 | 25.06 | 25.06 | 25.05 | 25.04 | 25.03 |
| 73 | 22.08 | 22.09 | 22.09 | 22.09 | 22.08 |
| 74 | 19.07 | 19.09 | 19.10 | 19.10 | 19.11 |
| 75 | 16.03 | 16.05 | 16.07 | 16.09 | 16.10 |
| 76 | 12.93 | 12.97 | 13.00 | 13.03 | 13.05 |

Following Table 1, 57≤β≤76 degree, β is an angle formed by second side S2 504 and third side S3 506; 12≤α≤14 degree, a is the incident angle at second side S2 504 or WDM filter 520; η=60 degree, is the internal angle formed by second side S2 504 and fourth side S4 508.

Figure 6:
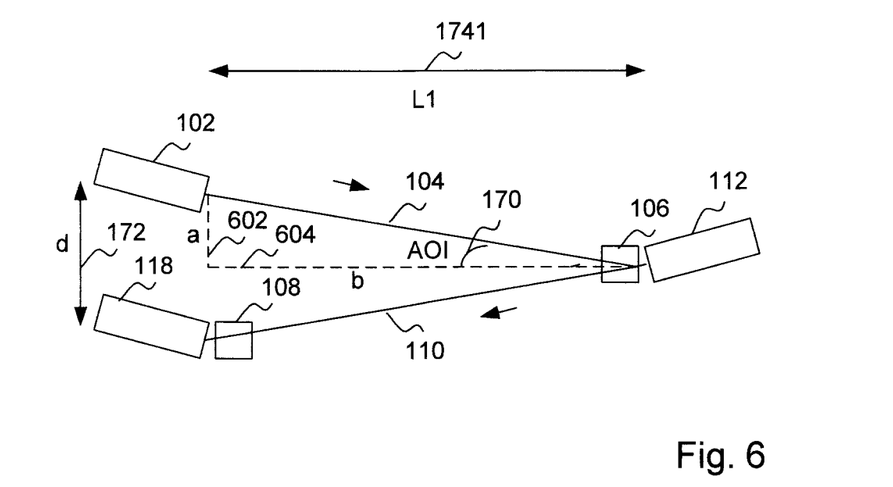
FIG. 6 illustrates schematically part of an exemplary OMS.

FIG. 6 illustrates schematically part of OMS 100 of FIG. 1. It shows relation of AOI 170, a 602, and b 604, that approximately $$\tan AOI = a/b, \quad (4)$$

a is half of d 172, and b is L1 1741, $$\tan AOI = d/(2 \times L1). \quad (5)$$

Distance d 172 is a spacing between neighboring LPs in a row. Length L1 1741 is a distance between two LP rows. AOI 170 may be 13.5 degree, to preserve low insertion loss, predetermined central wavelength and passband, and low polarization dependent loss. For d=3.5 mm and AOI=13.5 degree, L1=7.3 mm.

Figure 7:
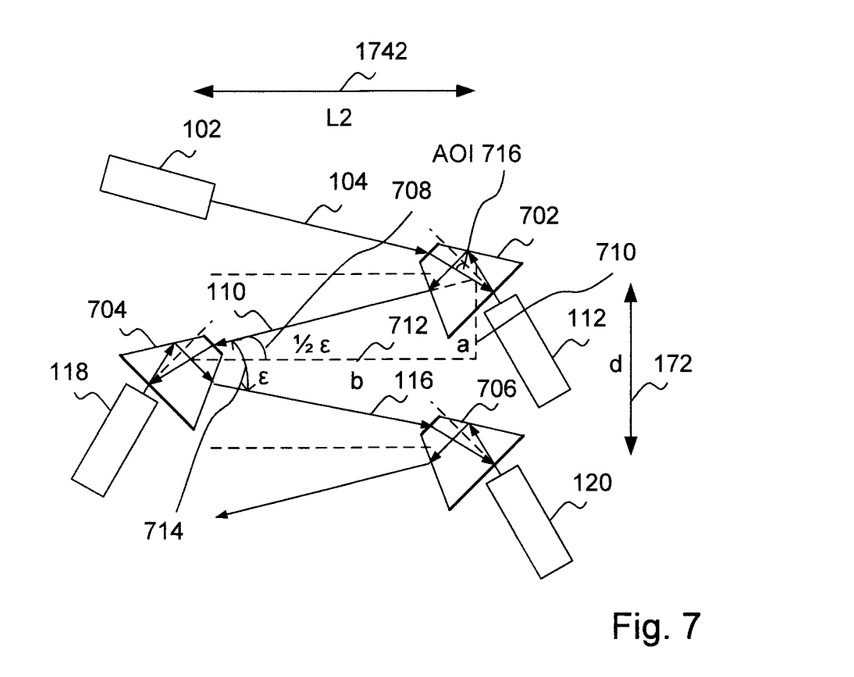
FIG. 7 illustrates schematically part of an exemplary OMS comprising WDM devices, according to an embodiment of the invention.

FIG. 7 illustrates schematically part of OMS 100 of FIG. 1 after replacing WDM filters 106, 108, . . . with WDM devices 702, 704, 706, . . . , according to an embodiment of the invention: WDM devices 702, 704, 706, . . . may be prism-WDM filters 500 of FIG. 5. Light 110 is incoming light 510 of FIG. 5, and light 116 is exiting light 532 of FIG. 5.

It shows relation of c 714, which is same as ε 536 of FIG. 5, a 710, and b 712, that approximately $$\tan(\varepsilon/2) = a/b, \quad (6)$$

a is half of d 172, and b is L2 1742, $$\tan(\varepsilon/2) = d/(2 \times L2). \quad (7)$$

Distance d 172 is a spacing between neighboring LPs in a row. Length L2 1742 is a distance between two LP rows. AOI 716 may be 13.5 degree, to preserve low insertion loss, predetermined central wavelength and passband, and low polarization dependent loss. AOI 716 is same as incident angle α 518 of FIG. 5. Table 1 shows that for β=57 degree, and α=13.5 degree, ε=69.12 degree. Inserting d=3.5 mm, ε=69.12 degree into Eq. (7) yields L2=2.5 mm.

Thus, by replacing WDM filters 106, 108, . . . with prism-WDM filters 500 in OMS 100 results in reducing from L1 1741 being 7.3 mm to L2 1742 being 2.5 mm, while the effective AOI, which is incident angle at the WDM filter a 518 of FIG. 5 is unchanged, e.g., α=13.5 degree. AOI 716 being 13.5 degree may preserve low insertion loss, predetermined central wavelength and passband, and low polarization dependent loss. L1 1741 in FIGS. 6 and L2 1742 in FIG. 7 are similar to L 174 in FIG. 1, which is the distance between two LP rows in FIG. 1. Thus, the size of OMS 100 can be reduced correspondingly. Consequently, the loss caused by the lateral shift of light after multiple reflections from WDM filters is also reduced substantially.

Figure 8:
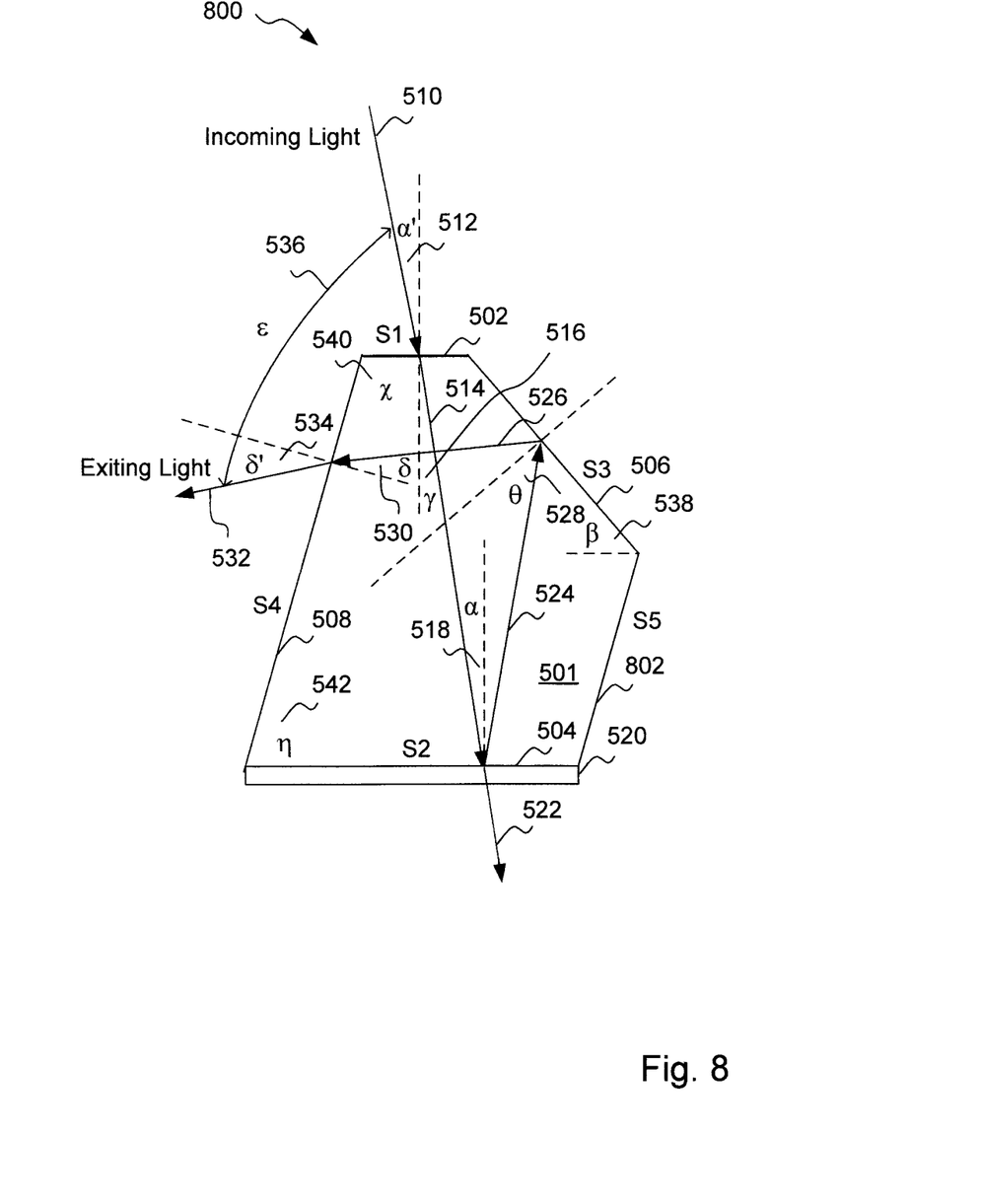
FIG. 8 illustrates schematically an exemplary prism-WDM filter, according to an embodiment of the invention.

FIG. 8 illustrates schematically an exemplary prism-WDM filter 800, according to an embodiment of the invention. Prism-WDM filter 800 is similar to prism-WDM filter 500 of FIG. 5, except third side S3 506 is cut forming a fifth side S5 802 between third side S3 506 and second side S2 504. Third side S3 and a plane parallel to second side S2 form angle β 538. Fifth side S5 802 does not affect incident light 514, reflected light 524, and total-reflection light 526. Thus, prism-WDM filter 800 is smaller than prism-WDM filter 500. Prism-WDM filter 800 can be used as WDM devises 702, 704, 706, . . . in FIG. 7 replacing prism-WDM filter 500.

Figure 9:
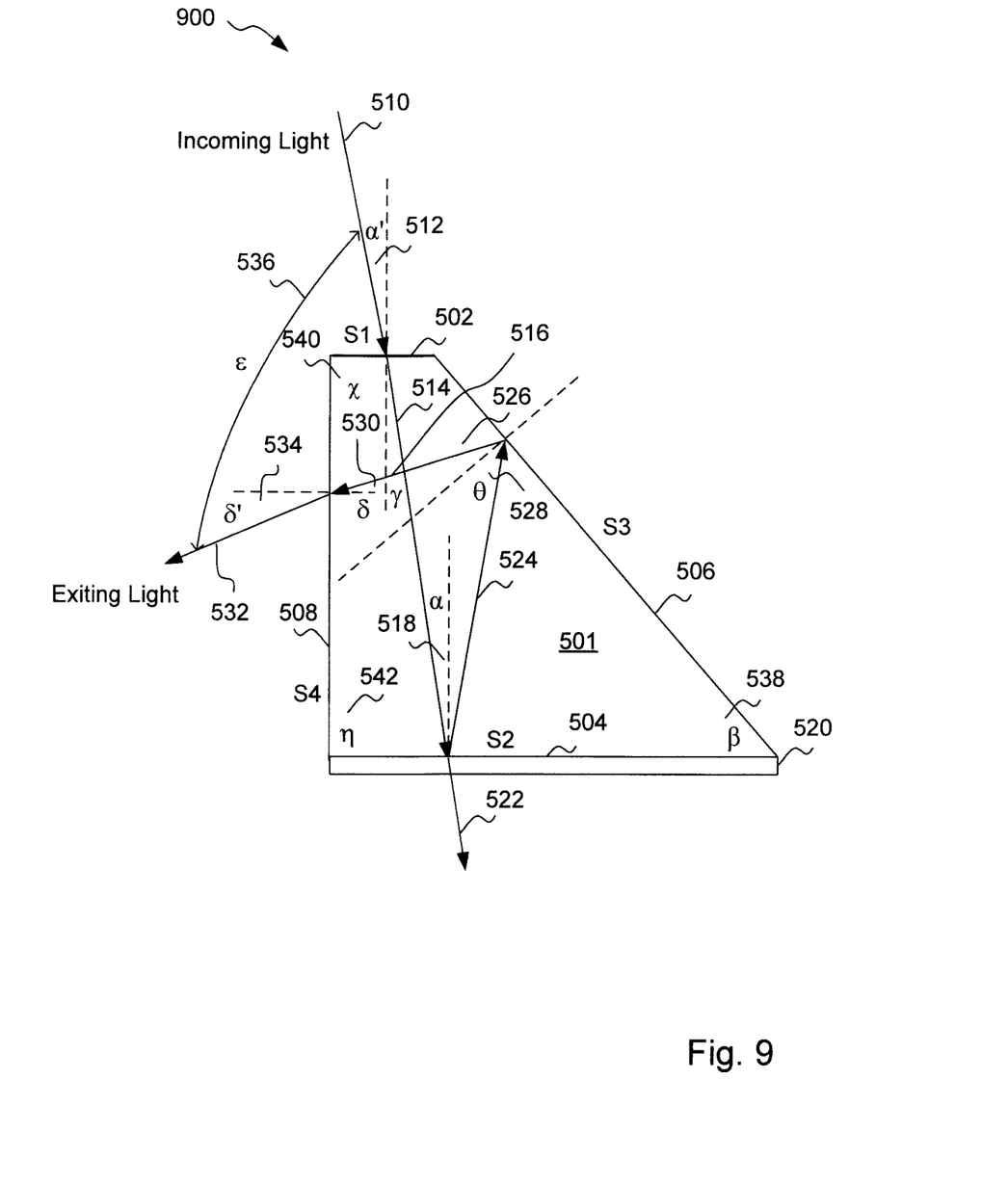
FIG. 9 illustrates schematically an exemplary prism-WDM filter, according to an embodiment of the invention.

FIG. 9 illustrates schematically an exemplary prism-WDM filter 900, according to an embodiment of the invention. Prism-WDM filter 900 is similar to prism-WDM filter 500 of FIG. 5, except internal angle χ 540 between first side S1 502 and fourth side S4 508 and internal angle η 542 between second side S2 504 and fourth side S4 508 are 90 degree. Prism-WDM filter 900 can be used as WDM devices 702, 704, 706, . . . in FIG. 7 replacing prism-WDM filter 500.

Figure 10:
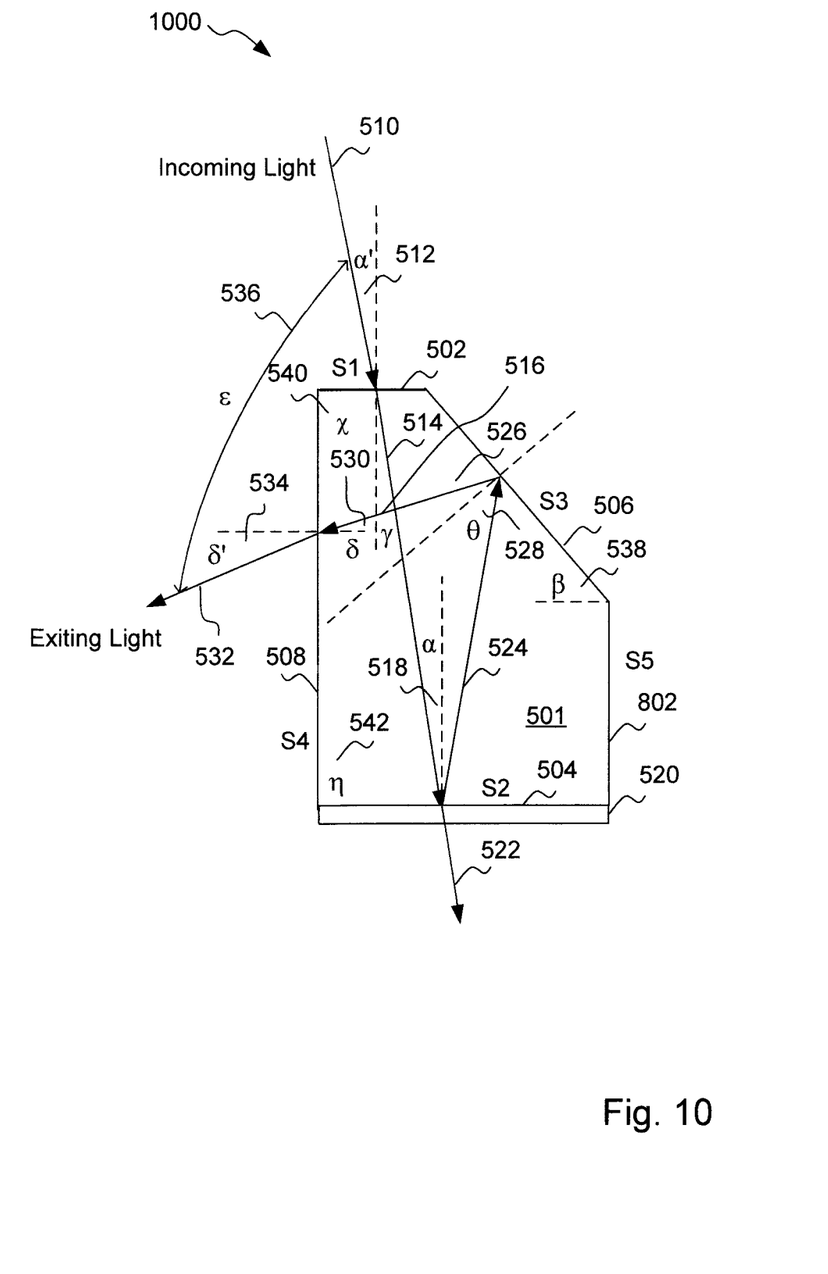
FIG. 10 illustrates schematically an exemplary prism-WDM filter, according to an embodiment of the invention.

FIG. 10 illustrates schematically an exemplary prism-WDM filter 1000, according to an embodiment of the invention. Prism-WDM filter 1000 is similar to prism-WDM filter 900 of FIG. 9, except third side S3 506 is cut forming fifth side S5 802 between third side S3 506 and second side S2 504. Third side S3 and a plane parallel to second side S2 form angle β 538. Fifth side S5 802 does not affect incident light 514, reflected light 524, and total-reflection light 526. Thus, prism-WDM filter 1000 is smaller than prism-WDM filter 900. Prism-WDM filter 1000 can be used as WDM devices 702, 704, 706, . . . in FIG. 7 replacing prism-WDM filter 500.

Figure 11:
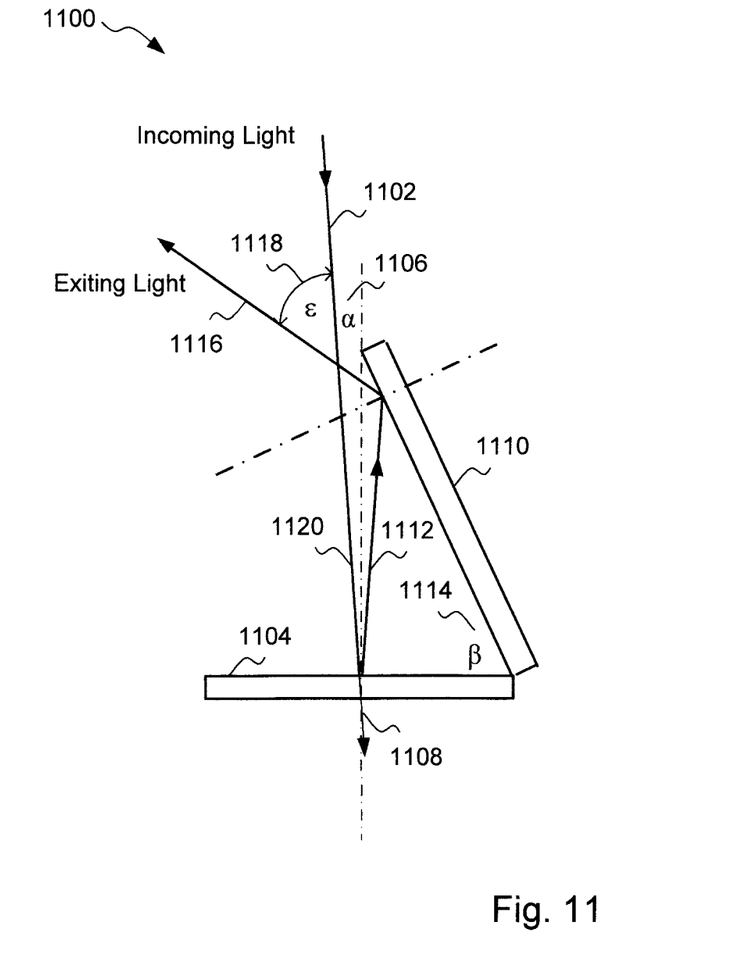
FIG. 11 illustrates schematically an exemplary mirror-WDM filter, according to an embodiment of the invention.

FIG. 11 illustrates schematically an exemplary mirror-WDM filter 1100, according to an embodiment of the invention. An incoming light 1102 is input to mirror-WDM filter 1100 comprising a mirror 1110 and a WDM filter 1104. Inside mirror-WDM filter 1100, which is a space between WDM filter 1104 and mirror 1110, incoming light 1102 becomes an incident light 1120. In Other words, incoming light 1102 is referred to as incident light 1120. Incident light 1120 is incident at WDM filter 1104 having an incident angle α 1106 at WDM filter 1104. In this manner, incident angle α 1106 is same as AOI 170 in OMS 100 of FIG. 1, or AOI 270 in IWDM 200 of FIG. 2 or IWDM 300 of FIG. 3.

Part of incident light 1120 is transmitted through WDM filter 1104 as a transmitted light 1108, and part of incident light 1120 is reflected as a reflected light 1112 toward mirror 1110 with a reflection angle same as incident angle α 1106. Mirror 1110 and WDM filter 1104 form an internal angle β 1114, β is less than 90 degree. Preferably, β is less than 60 degree. Reflected light 1112 is further reflected by mirror 1110 as an exiting light 1116. The angle formed between incoming light 1102 and exiting light 1116 is c 1118. Angle ε 1118 is similar to ε 536 in FIGS. 5, 8, 9, and 10. Thus, mirror-WDM filter 1100 can be used as WDM devices 702, 704, 706, . . . in FIG. 7.

Referring back to FIG. 7, WDM devices 702, 704, 706, . . . may be mirror-WDM filters 1100 of FIG. 11, instead of prism-WDM filters 500 of FIG. 5. Light 110 is incoming light 1102 of FIG. 11, and light 116 is exiting light 1116 of FIG. 11.

An OMS is disclosed. Part of the OMS is schematically illustrated in FIG. 7. The OMS comprises a WDM device 704, an incoming light 110 input to WDM device 704, and an exiting light 116 is output from WDM device 704. WDM device 704 may be a prism-WDM filter 500 of FIG. 5 or a mirror-WDM filter 1100 of FIG. 11. Incoming light 110 may be incoming light 510 in FIG. 5 or incoming light 1102 of FIG. 11. Exiting light 116 may be exiting light 532 of FIG. 5 or exiting light 1116 of FIG. 11. WDM device 704 comprises a WDM filter. The WDM filter may be WDM filter 520 of FIG. 5 or WDM filter 1104 of FIG. 11. An incident light, e.g., incident light 514 of FIG. 5 or incident light 1120 of FIG. 11, is incident at the WDM filter having an incident angle at the WDM filter, e.g., incident angle α 518 of FIG. 5 or incident angle α 1106 of FIG. 11. The incident light is partially transmitted through the WDM filter, e.g., transmitted light 522 in FIG. 5 or transmitted light 1108 of FIG. 11, and partially reflected from the WDM filter, e.g., reflected light 524 of FIG. 5 or reflected light 1112 of FIG. 11. An angle, e.g., angle c 536 of FIG. 5 or angle c 1118 of FIG. 11, formed by incoming light 110 and exiting light 116 is larger than twice of incident angle at the WDM filter or 2a.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An optical multiplexing system comprising:
   a wavelength division multiplexing (WDM) device;
   an incoming light input to the WDM device;
   an exiting light output from the WDM device;
   wherein the WDM device comprises a WDM filter, an incident light is incident at the WDM filter having an incident angle at the WDM filter, the incident light is partially transmitted through the WDM filter and partially reflected from the WDM filter;
   wherein an angle formed by the incoming light and the exiting light is larger than twice of the incident angle at the WDM filter;
   a prism having a first side, a second side, a third side, and a fourth side, the first side and the second side are opposite sides, and the third side and the fourth side are opposite sides;
   wherein the WDM filter is attached to the second side of the prism;

wherein the incoming light enters the prism from the first side of the prism, is refracted as an incident light, the incident light passes the second side of the prism incident at the WDM filter having the incident angle, wherein the incident light is partially reflected by the WDM filter in the prism as a reflected light, and the reflected light is incident at the third side of the prism;

wherein the third side of the prism reflects the reflected light by total internal reflection toward the fourth side of the prism;

wherein the reflected light is refracted by the fourth side of the prism as the exiting light, and the exiting light exits the prism.

2. The optical multiplexing system of claim 1, wherein the first side and the second side are parallel.

3. The optical multiplexing system of claim 2, wherein an angle formed by the second side and the third side is $\beta$, and $57 \leq \beta \leq 76$ degree.

4. The optical multiplexing system of claim 2, wherein an angle formed by the second side and the fourth side is $\eta$, and $\eta=60$ degree.

5. The optical multiplexing system of claim 1, wherein the third side is cut forming a fifth side between the third side and the second side.

6. The optical multiplexing system of claim 1, wherein an angle formed by the second side and the fourth side is 90 degree.

7. The optical multiplexing system of claim 6, wherein the third side is cut forming a fifth side between the third side and the second side.

8. The optical multiplexing system of claim 1, wherein the incident angle at the WDM filter is $\alpha$, and $12 \leq \alpha \leq 14$ degree.

9. The optical multiplexing system of claim 1, wherein a refractive index of the prism is 1.44.

10. A prism-WDM filter comprising:
a prism comprising a first side, a second side, a third side, and a fourth side, the first side and the second side are opposite sides, and the third side and the fourth side are opposite sides;

wherein the WDM filter is attached to the second side of the prism;

wherein an incoming light enters the prism from the first side of the prism, is refracted as an incident light, the incident light passes the second side of the prism incident at a WDM filter having an incident angle at the WDM filter, wherein the incident light is partially reflected by the WDM filter in the prism as a reflected light, and the reflected light is incident at the third side of the prism;

wherein the third side of the prism reflects the reflected light by total internal reflection toward the fourth side of the prism;

wherein the reflected light is refracted by the fourth side of the prism as an exiting light, and the exiting light exits the prism;

wherein the incident light is partially transmitted through the WDM filter;

wherein an angle formed by the incoming light and the exiting light is larger than twice of the incident angle at the WDM filter.

11. The prism-WDM filter of claim 10, wherein the first side and the second side are parallel.

12. The prism-WDM filter of claim 11, wherein an angle formed by the second side and the third side is $\beta$, and $57 \leq \beta \leq 76$ degree.

13. The prism-WDM filter of claim 11, wherein an angle formed by the second side and the fourth side is $\eta$, and $\eta=60$ degree.

14. The prism-WDM filter of claim 10, wherein the incident angle at the WDM filter is $\alpha$, and $12 \leq \alpha \leq 14$ degree.

15. The prism-WDM filter of claim 10, wherein a refractive index of the prism is 1.44.

* * * * *